(12) United States Patent
Schultz et al.

(10) Patent No.: US 9,887,542 B2
(45) Date of Patent: Feb. 6, 2018

(54) POWER BROKER MODULE

(71) Applicant: Honeywell International Inc., Morristown, NJ (US)

(72) Inventors: David Schultz, Savage, MN (US); Devin Diedrich, Ramsey, MN (US); Michael Lunacek, Rogers, MN (US); Jiri Frint, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 424 days.

(21) Appl. No.: 14/451,152

(22) Filed: Aug. 4, 2014

(65) Prior Publication Data

US 2016/0036227 A1 Feb. 4, 2016

(51) Int. Cl.
*G05B 15/02* (2006.01)
*H02J 3/00* (2006.01)
*G06Q 50/06* (2012.01)

(52) U.S. Cl.
CPC .............. *H02J 3/005* (2013.01); *G05B 15/02* (2013.01); *G06Q 50/06* (2013.01); *G05B 2219/2639* (2013.01)

(58) Field of Classification Search
CPC ............ G05B 15/02; G05B 2219/2639; G06Q 50/06; H02J 3/005
USPC ................................................. 700/282, 295
See application file for complete search history.

(56) References Cited

U.S. PATENT DOCUMENTS

| 7,015,599 | B2 | 3/2006 | Gull et al. |
| 8,511,576 | B2 | 8/2013 | Warren et al. |
| 2002/0029085 | A1* | 3/2002 | Park ........................ G05B 15/02 700/19 |
| 2002/0162036 | A1* | 10/2002 | Kim ......................... G06F 1/266 713/300 |
| 2009/0113221 | A1* | 4/2009 | Holle ....................... G06F 1/189 713/310 |
| 2012/0179300 | A1* | 7/2012 | Warren .................. F24F 11/0012 700/278 |

(Continued)

FOREIGN PATENT DOCUMENTS

| JP | 2012533727 | 12/2012 |
| WO | 2010031027 | 3/2010 |

OTHER PUBLICATIONS

International Search Report and Written Opinion of the International Searching Authority for Corresponding PCT Application Serial No. PCT/US2015/042806 dated Oct. 27, 2015.

*Primary Examiner* — Yuhui R Pan
(74) *Attorney, Agent, or Firm* — Seager, Tufte & Wickhem, LLP (57) ABSTRACT

A processor and power broker for controlling the obtaining, distribution and usage of electrical power for electronic devices such as peripherals of thermostats. Sources of power may incorporate batteries, energy harvesting modules, energy storage capacitors, and power lines. The power broker may maintain charge on the capacitors, operate the energy harvesting modules, control usage of the batteries, and utilize power line sources when available. Loads such as the peripherals may need to request approval for energy usage. Energy usage and conservation may be managed by the power broker according to a power scheme. A power scheme may consist of a set of rules as to how energy usage by the peripherals is to be managed. The rules may also indicate as to how the energy sources are managed.

19 Claims, 6 Drawing Sheets

(56) References Cited

U.S. PATENT DOCUMENTS

| | | |
|---|---|---|
| 2012/0226572 A1 | 9/2012 | Park et al. |
| 2012/0248210 A1* | 10/2012 | Warren ................ F24F 11/0012 236/1 C |
| 2012/0256009 A1 | 10/2012 | Mucignat et al. |
| 2013/0221117 A1 | 8/2013 | Warren et al. |
| 2013/0253710 A1 | 9/2013 | Fadell et al. |
| 2013/0261803 A1 | 10/2013 | Kolavennu |

* cited by examiner

FIGURE 1

```
/// transition table for situations when the C wire is powering the thermostat
FORCE_TO_CODE t_PowerSchemeTransition PowerSchemeTableCwire [N_POWER_SCHEMES] =
{
    /*PS_INITIAL*/           {            0,  PS_MAXIMUM_SAVING,    0,  PS_INITIAL,            0 },
    /*PS_SLEEP_ONLY*/        {            0,  PS_MAXIMUM_SAVING,    0,  PS_SLEEP_ONLY,         0 },
    /*PS_CHARGING*/          {            0,  PS_MAXIMUM_SAVING,    0,  PS_CHARGING,           0 }, /*PS_MAXIMUM_SAVING*/    {         2400,  PS_FULL_POWER,        0,  PS_MAXIMUM_SAVING,     0 },
    /*PS_SUBSTANTIAL_SAVING*/{         2400,  PS_FULL_POWER,     1100,  PS_MAXIMUM_SAVING, 0xFFFF },
    /*PS_EVIDENT_SAVING*/    {            0,  PS_MAXIMUM_SAVING,    0,  PS_MAXIMUM_SAVING, 0xFFFF },
    // not used
    /*PS_STEALTHY_SAVING*/   {         2400,  PS_FULL_POWER,     1100,  PS_MAXIMUM_SAVING,  1100 },
    /*PS_FULL_POWER*/        {       0xFFFF,  PS_FULL_POWER,     1800,  PS_STEALTHY_SAVING, 2400 },
};
```

FIGURE 2

| Energy User | FULL POWER |
|---|---|
| UI Display | Display runs normally. No user interaction is limited |
| Glow Ring | Glow ring episode starts when the UI accepts a changed value. An episode consists of 500 mSec ramp up, 1 sec full brightness, and 500 uSec ramp down. |
| Wi-Fi | WIFI Power State = HIGH |
| Sound | Sound runs normally |
| PIR | PIR runs normally |
| Optical Encoder | Optical Encoder runs normally |

```
/// resource configuration for high power scheme.
FORCE_TO_CODE t_PowerSchemeData powerSchemeFULL =
{
    /*Control Enabled;           = */ TRUE,
    /*UiPowerState;              = */ UI_POWER_FULL,
    /*WiFiPowerState;            = */ WIFI_POWER_HIGH,
    /*WiFiPowerStateNoReason     = */ WIFI_POWER_HIGH,
    /*ReprogramEnabled;          = */ TRUE,
    /*SoundEnabled;              = */ TRUE,
    /*PirSensorEnabled;          = */ TRUE,
    /*GlowRingEnabled;           = */ TRUE,
};
```
33

POWER BROKER MODULE

BACKGROUND

The present disclosure pertains to power attainment and distribution for electronic devices.

SUMMARY

The disclosure reveals an approach of ensuring that the available energy source or sources that may be "smartly" distributed to a defined number of loads or consumers of energy. One benefit of a power broker may be to support low power devices, thus maximizing the duration of operation utilizing the available energy source or sources. This may consist of a processor and a power broker for controlling the obtaining, distribution and usage of electrical power for electronic devices such as peripherals of thermostats. Sources of power may incorporate batteries, energy harvesting modules, energy storing capacitors, and power lines. The power broker may maintain charge on the capacitors, operate the energy harvesting modules, control usage of the batteries, and utilize power line sources when available. Loads such as the peripherals may need to request approval for energy usage. Energy usage and conservation may be managed by the power broker according to a power scheme. A power scheme may consist of a set of rules as to how energy usage by the peripherals is to be managed. The rules may also indicate as to how the energy sources are managed.

BRIEF DESCRIPTION OF THE DRAWING

Table 4 is a diagram that reveals a resource configuration for a high power scheme.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous additional examples or ways of implementing the system and approach.

Smart communicating devices may use power hungry communicating approaches, such as WiFi, Bluetooth, Cellular, and Zigbee, to name a few. The connected device may be becoming a common feature within today's modern home. One example may be the smart phone which users use for calling, texting, and web surfing. The smart phone may make use of multiple communication approaches such as Bluetooth, cellular, and WiFi, which use a significant amount of energy to stay in operation. Users of smart phones may be accustomed to charging their phone on a daily schedule, in order to ensure that it is ready for use the next day. Other communicating devices do not have the luxury of being recharged on a daily basis. Some may be battery powered or may harvest energy and need to be smart about their energy usage, as well as using small amounts of power.

A power broker module may add energy "smarts" within a device. The broker module may know what energy is available within the device and then may dole it out to other modules/peripherals within the device. The power broker may function similar to that of a controller at a power plant which provides appropriate power relative to a demand of an electrical grid. Many smart devices may draw energy from a source as needed as power for peripherals such as a display, backlight, WiFi radio, and so forth. A feature of the power broker is that power usage by a peripheral needs approval from the power broker prior to a turning on the peripheral. The power broker may provide approval for the peripheral to be turned on based on an amount of energy available and a priority of the peripheral functionality (e.g., a user initiated action may have a higher priority than some background task). Furthermore, the power broker may request a switch to a different power source if conditions require such (e.g., switch to a more capable power source when high consumption occurs).

The power broker may be a software module within the architecture of an embedded system. The purpose of the power broker is to analyze the power sources and the amount of energy currently available, and then to respond to peripherals' requests to use a portion of the available energy. The power broker may approve a request for immediate power consumption by the peripheral or deny the request. If the request is denied, the peripheral may make a request again almost immediately, or delay the request.

The power broker module may determine the states of operation. Peripherals may behave according to a power scheme that is determined by the power broker. The power broker does not necessarily behave according to a power scheme.

Figure 1:
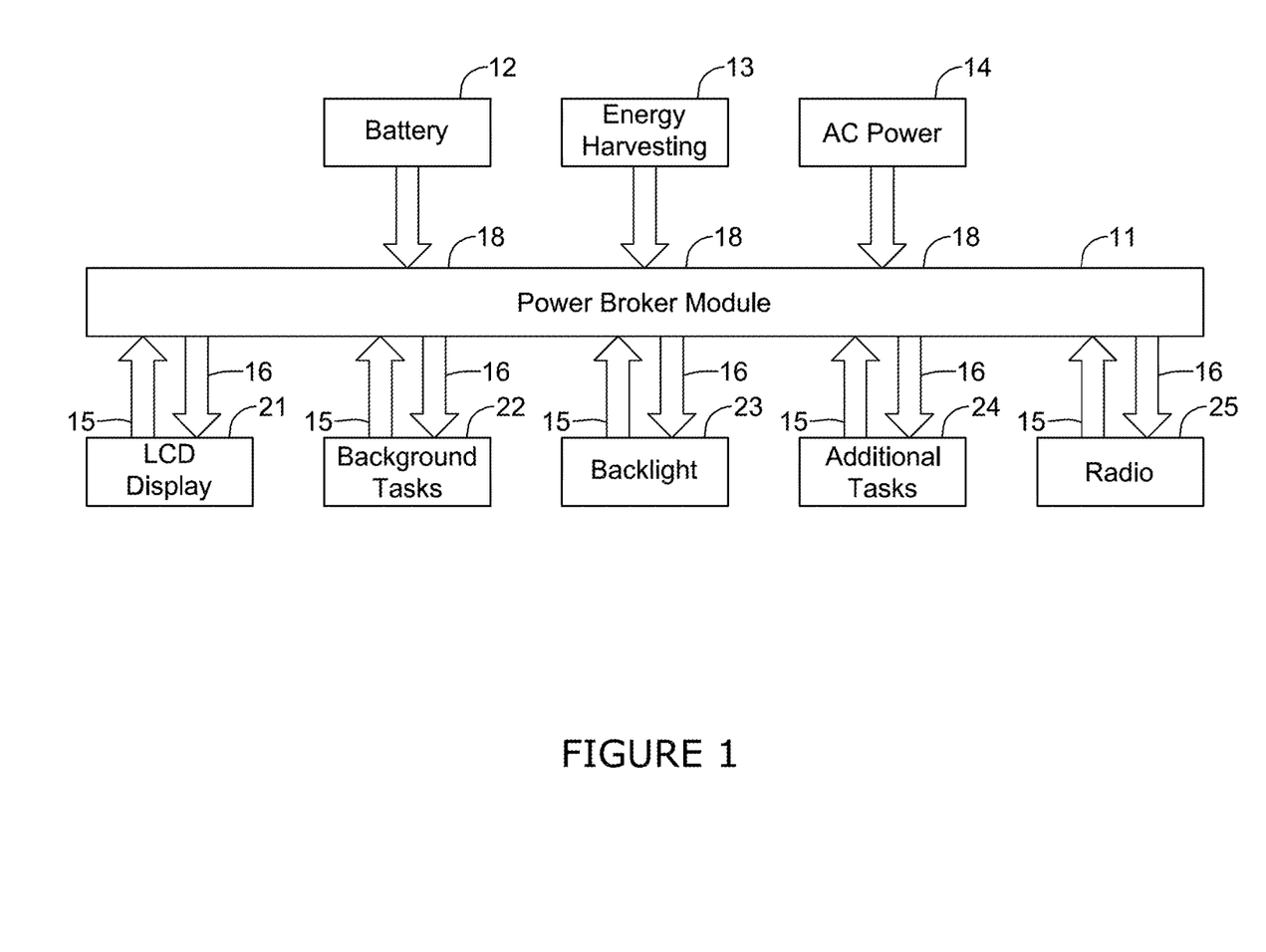
FIG. 1 is a diagram of a power broker module.

FIG. 1 is a diagram of a power broker module 11. Energy information 18 may be available from a battery 12, energy harvesting 13 and AC power 14 and be provided to power broker 11. Energy information 18 may be provided from other energy sources to power broker 11. There may be a request 15 for energy and a response 16 to the request for energy by peripherals. Examples of peripherals may incorporate LCD display 21, background tasks 22, backlight 23, additional tasks 24 and a radio 25.

The power broker may have the following features. The user interface experience may be different when normal AC or continual power (e.g., a C wire) is present vs. when continual power is not present (e.g., power stealing). During a power stealing mode, the device should support a predefined set number of user interactions without degrading the user interface experience. During this set of user interactions, other resources using power may be degraded (e.g., a radio module). The battery may provide a fixed number of user interactions based on battery capacity and usage per interaction. The battery may provide 200 user interactions over the course of one year. Boot loaders do not necessarily have knowledge of power or the circuit implementing power harvesting, stealing or transformation. There may be detection of a wall plate removal when AC power and/or battery power is lost. The battery should be installed in that the power harvesting circuit may need initial power to run.

A thermostat may need to count the charge/discharge cycles of an ultra or super cap in order to determine the cap's life cycle. The thermostat user interface (UI) may be limited until the power broker allows the UI to fully operate. The thermostat may show charging until the voltage of an energy storage capacitor (e.g., an ultra or super capacitor) reaches a predefined level that is deemed appropriate to operate the device. After that, the power broker may allow other modules of the thermostat to operate (e.g., LCD and Wi-Fi radio). The other modules may function based on state based power schemes, such as Full (AC), Full (Batt), Charging, and OFF, or HIGH, MEDIUM, LOW, VERY LOW, and CRITICAL. Reference may be made to a power schemes definition for more information. When super cap voltage reaches a very low threshold, the power broker may enforce a VERY_LOW scheme, the modules may be switched to low power mode. The thermostat may monitor power stealing. If there is very low effectiveness, the thermostat may live from the battery. If the battery goes to the survival level, the user interface may be turned off and the Wi-Fi reduced. Furthermore, if the ultra or super cap is nearly depleted, the Wi-Fi and control algorithms may turn off.

If the power stealing is not effective enough, a battery may be used to power the thermostat and charge the capacitor. There is necessarily no difference in the way the thermostat behaves while powered from power stealing or a battery. When the super cap is depleted, the thermostat may continue in operation using the battery. As long as the battery is good, there will necessarily not be any indication to a user that the thermostat has changed source of power. The installer commissioning (do it yourself) process may be done using either AC or a battery. The power stealing may not necessarily be available at that time. When the installer commissioning process is done using the battery power, the energy harvesting module may be responsible to provide power to the thermostat. The installer commissioning process may be terminated if the power levels become critical (e.g., a very low battery).

If the thermostat is powered up, it may wait until the super cap is charged to a level where a normal operation can run. Until the super cap is charged, thermostat may via a user interface to inform the user about charging.

When AC power is lost (including power stealing), the thermostat may go into sleep mode thereby saving the energy in the super cap and battery.

When AC and battery power is lost (e.g., wall plate removal), the thermostat may go into a sleep mode and thus save energy in the super cap.

The power supply monitor (PSM) may report battery voltage, super cap voltage and capacity to device application. The thermostat system may use several power sources to satisfy energy needs. Sources may incorporate AC power, power stealing, a battery, and a super capacitor.

Figure 2:
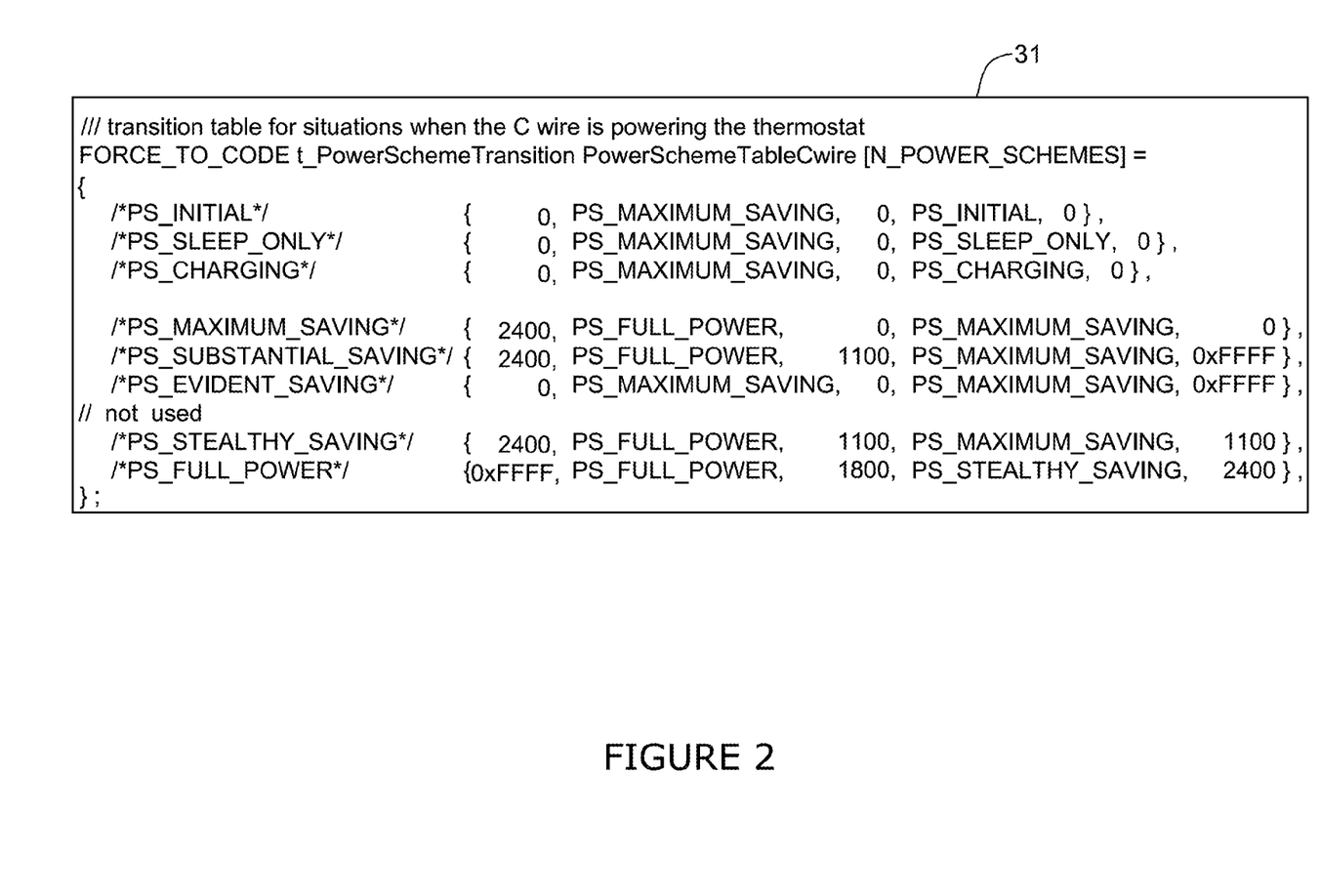
FIG. 2 is a diagram of table that is implemented in a code as a constant lookup table stored in a non-volatile memory.

The power of super capacitor may depend on other power sources and be charged from those sources. However, AC power or power stealing may be most likely resorted to. Based on the power source parameters, a power scheme is determined. Each combination of power levels a corresponding power scheme is assigned. The more power provided, a higher power scheme may be used. FIG. 2 is a diagram of a table 31 that is implemented in a code as a constant lookup table stored in a non-volatile memory.

Figure 3:
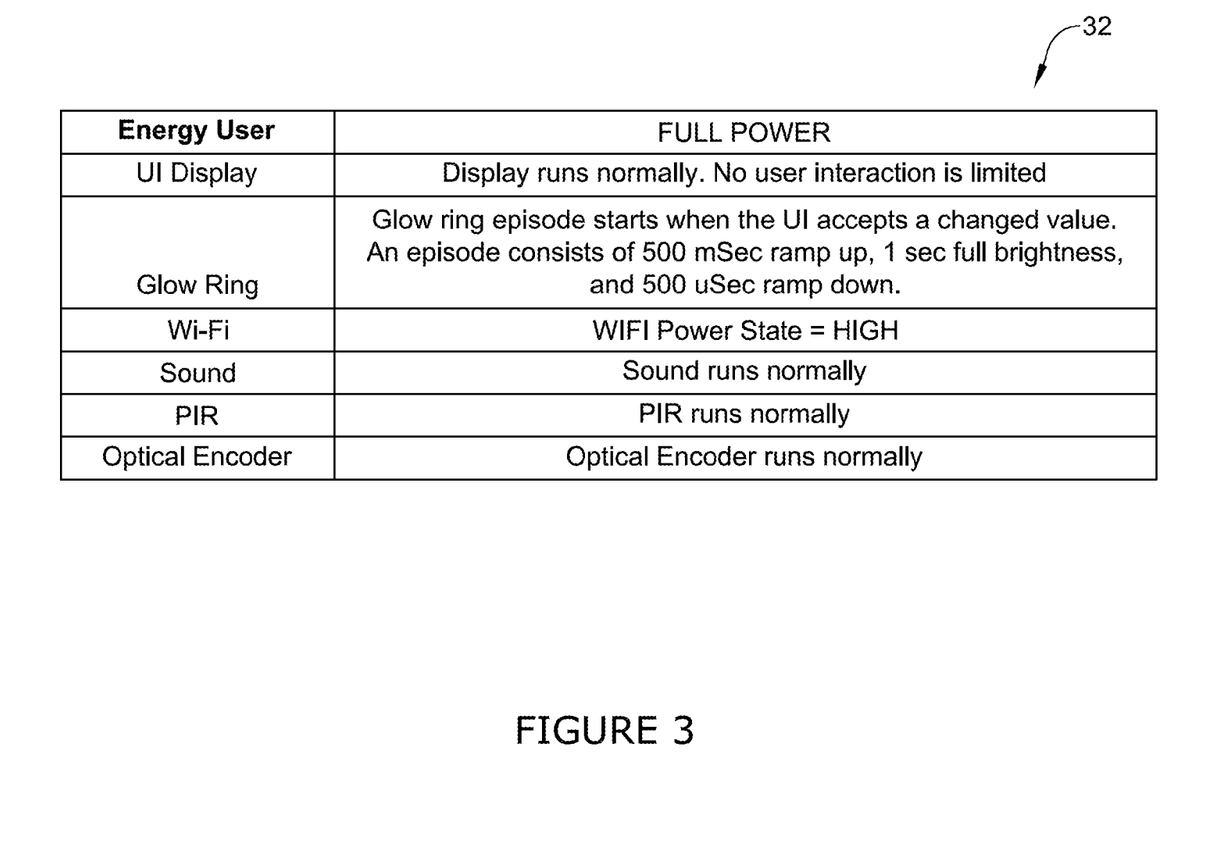
FIG. 3 is a diagram of a table that provides an example of the rules for resources.
Figure 4:
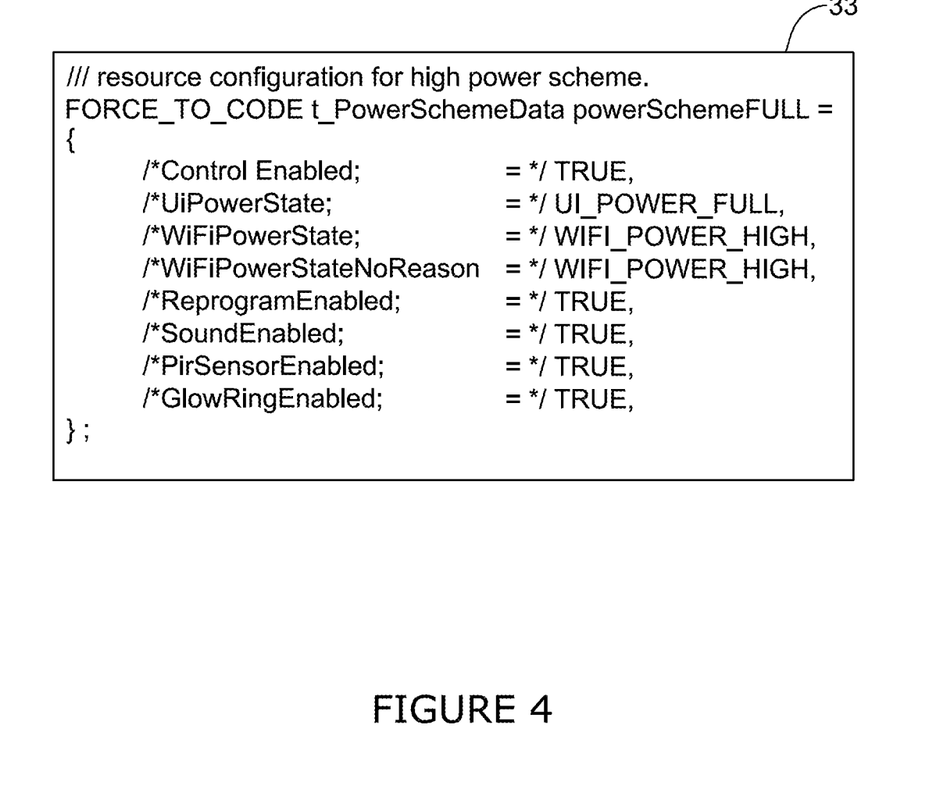

Each power scheme may consist of a set of rules indicating how the power consuming resources are to be driven. Resource parameters (e.g., LCD backlight brightness) may be controlled based on an actual power scheme that corresponds to the power levels of the available sources. FIG. 3 is a diagram of a table 32 that provides an example of the rules for resources. Table 32 reveals the example of resource parameters for each power scheme. The values stored in this table may be subsequently used by the application to control the resources. In the code, each power scheme may be implemented as a constant structure with values corresponding to the table. Table 33 in a diagram of FIG. 4 reveals a resource configuration for a high power scheme.

Following is some additional information describing the operating schemes of the power broker module. These power schemes may be modified in order to support new features or desired operation. The consumers of the available will use this information to determine how to operate (i.e., low energy operations, normal mode, and so forth).

For the purpose of the power broker, several power schemes (operating modes) may be defined. The schemes may differ in the way that they provide power to the particular resource. A full power scheme may be used when there is lot of power from power sources. This scheme may occur mainly when the thermostat is powered from AC power. The other case may be when the capacitor is fully charged from the power stealing and there a high charge rate for the super capacitor. In this mode, all resources may be accessible.

For a stealthy saving power scheme, everything that is visible to the user may need to be same as for a full power scheme. Besides the user interface, other resources may be reduced or disabled. This scheme or mode may allow power saving without the user noticing it. The mode may provide more time for the user interface to run from a capacitor. In the stealthy power saving mode, the responses from an application might be prolonged since the WiFi may run with longer timeouts. Also, the actions that are not time-critical may be paused and postponed. This mode, for example, may mean a field upgrade download through Wi-Fi.

There may be a reduced user interface scheme or mode. If the power continues to drop and there is need for more saving, the user interface parameters may need to be reduced. In this power scheme or mode, the LCD brightness may be reduced, the LED delays might be shortened, and so on. The thermostat may still be operable, but users might see some differences in the user interface UI appearance. This scheme or mode might be the lowest power mode where an initial application run can be done. The application will not necessarily start if the power scheme is not higher or equal to this level.

Evident saving may be another power scheme or mode. The power may be so low that Wi-Fi consumption is reduced more. The ping attempts and asynchronous messages may be disabled to save power. The control algorithms and scheduling may still work and the user is still able to control the thermostat using its user interface. The communication might be also restricted, but it may still be functional (with longer delays or so). In this scheme or mode, the saving may be evident to the user since the user might notice that the commands from the web are not processed to the thermostat.

In a substantial saving scheme or mode, the Wi-Fi may need to be turned off in order to prevent further discharge of a super or ultra capacitor. The user interface may remain unaffected; except the glow ring, which may be disabled in the case that the mode was not entered due to user interaction. In the substantial saving mode, the Wi-Fi may be in a broadcast off state which means that it goes disconnected from the router.

In a maximum saving scheme or mode, there may be only power to do the simplest tasks. The thermostat may still work in controlling equipment and the user interface, the communication does not necessarily work. The radio module may be put into a deep sleep mode in that the sounds are also disabled.

From a user interface point of view, a user may still be able to control the thermostat and a control algorithms run, but the glow ring may be disabled. The super cap may be charged and provide energy to the thermostat.

In a sleep only scheme or mode, the thermostat may no longer control the equipment. All of the power may be used to maintain a clock; however, the clock might not necessarily be needed since it may be received from a cloud. The sleep only scheme or mode may be is used when the thermostat is removed from wall. This mode may save as much energy as possible to maintain the charge in super cap. Maintaining the super cap charge may be important, since it can prevent long charging times after power is applied again. Several conditions for this mode may incorporate a situation where AC power is disconnected, the battery is disconnected, and that there is no C wire operation.

A determination of power may be made for a given resource via accessors, serial communications, flags stored in non-volatile memory, and/or GPIO. Based on the power source levels, conditions may be evaluated to tell whether given resource can be used or not. An evaluation may be is done using an accessor function that looks into a structure for a current scheme and evaluates its condition. Furthermore, the accessor does not necessarily need to rely on the power scheme constants and may evaluate more parameters if needed. This approach may allow creating more complicated conditions without a need for complicated lookup tables.

After the accessor function is called to get the most recent result, this result may be compared with the last result. In a case where the power conditions changed for the resource, a call back may be done to inform the application about this. Subsequently, the application may react to the call back accordingly. The current result may be stored for further use.

Figure 5:
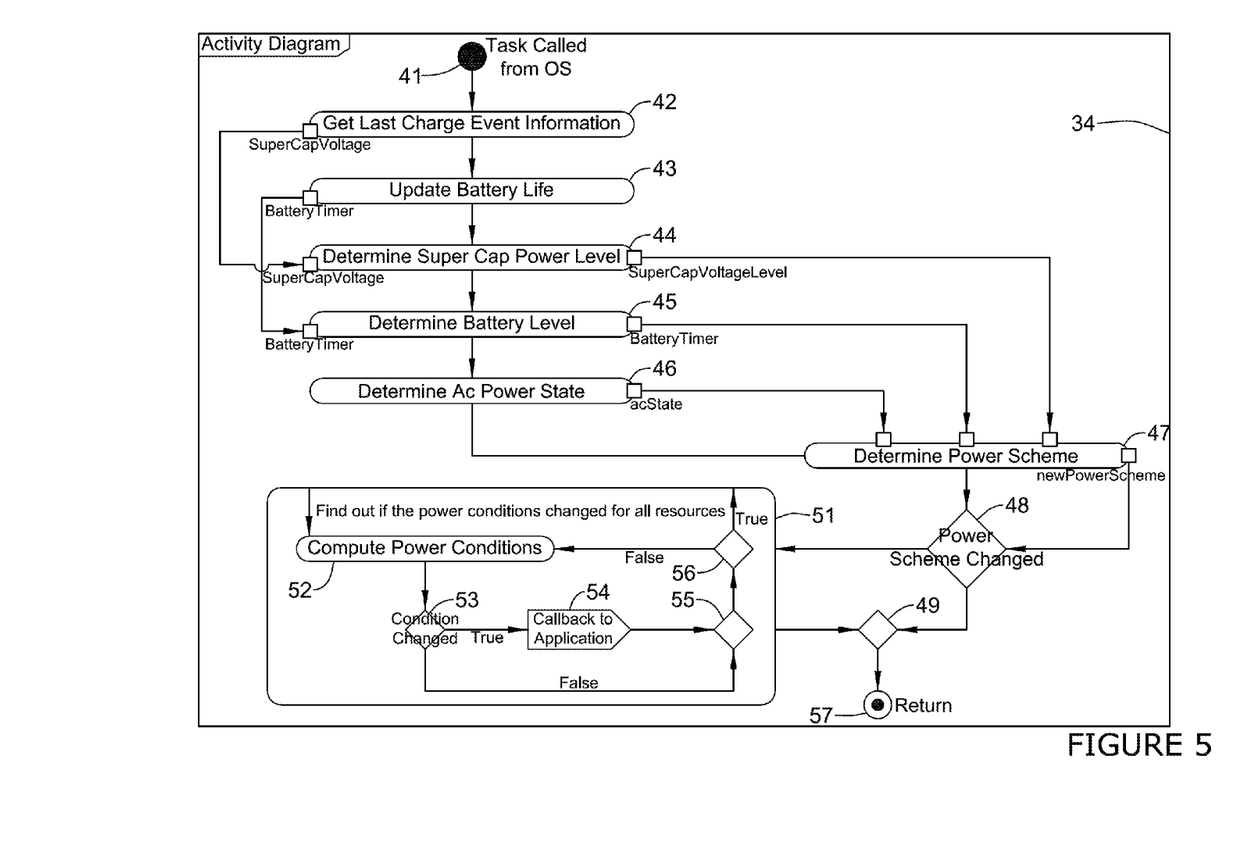
FIG. 5 is a diagram of power broker activity.

FIG. 5 is a diagram 34 of power broker activity. There is discussion whether a boot loader has a power broker capability or not. The application may have control of power and know whether there is enough power to program the application micro. With this assumption, the boot loader does not necessarily need to have a power broker; it may be enough to determine the power source on the beginning of the boot loader execution. Once a programming process starts, it should be finished. So it may be acceptable to have just a threshold for the capacitor voltage. If the voltage drops below threshold, the programming process may be interrupted and the thermostat can wait until the super cap is charged. Then, the programming process may continue. During this time the resources may be turned off with an exception of an LCD that displays the progress of update.

At a start 41 of diagram 34, a task may be called from the OS. Last charge information may be obtained at symbol 42. The information may indicate a need to update battery life that may be updated at symbol 43. If the battery is to be charged, a battery timer may be set and the battery level may be determined at symbol 45. Super cap voltage may be obtained according to symbol 42 at symbol 44. An AC power state may be determined at symbol 46. The super cap voltage, the battery level and the AC state may be provided from symbols 44, 45 and 46, respectively, to a symbol 47 where a power scheme may be determined. The power scheme may be provided to a symbol 48 that may ask a question whether the power scheme has changed. If an answer is no, then the response may go to a symbol 49. If the answer is yes, then the response may go to a symbol 51 where it may be found out if the power conditions have changed for resources. Power conditions may be computed at symbol 52. A question as to whether conditions have change may be asked at symbol 53. If an answer is yes, then a callback to the application may be made at symbol 54 and then proceeding to a symbol 55 may be effected. If the answer is no, then a direct move avoiding a callback to application may be made to a symbol 56 which may have a question as to whether all resources have been checked relative to a changes of power conditions. If an answer is no, then a return to symbol 52 may be made with going through symbols 53-56. If the answer is yes, then a proceeding may go to symbol 49. Items at symbol 49 may go on to symbol 57 which indicates a return to symbol 41 where a task is again called from the operating system (OS).

Figure 6:
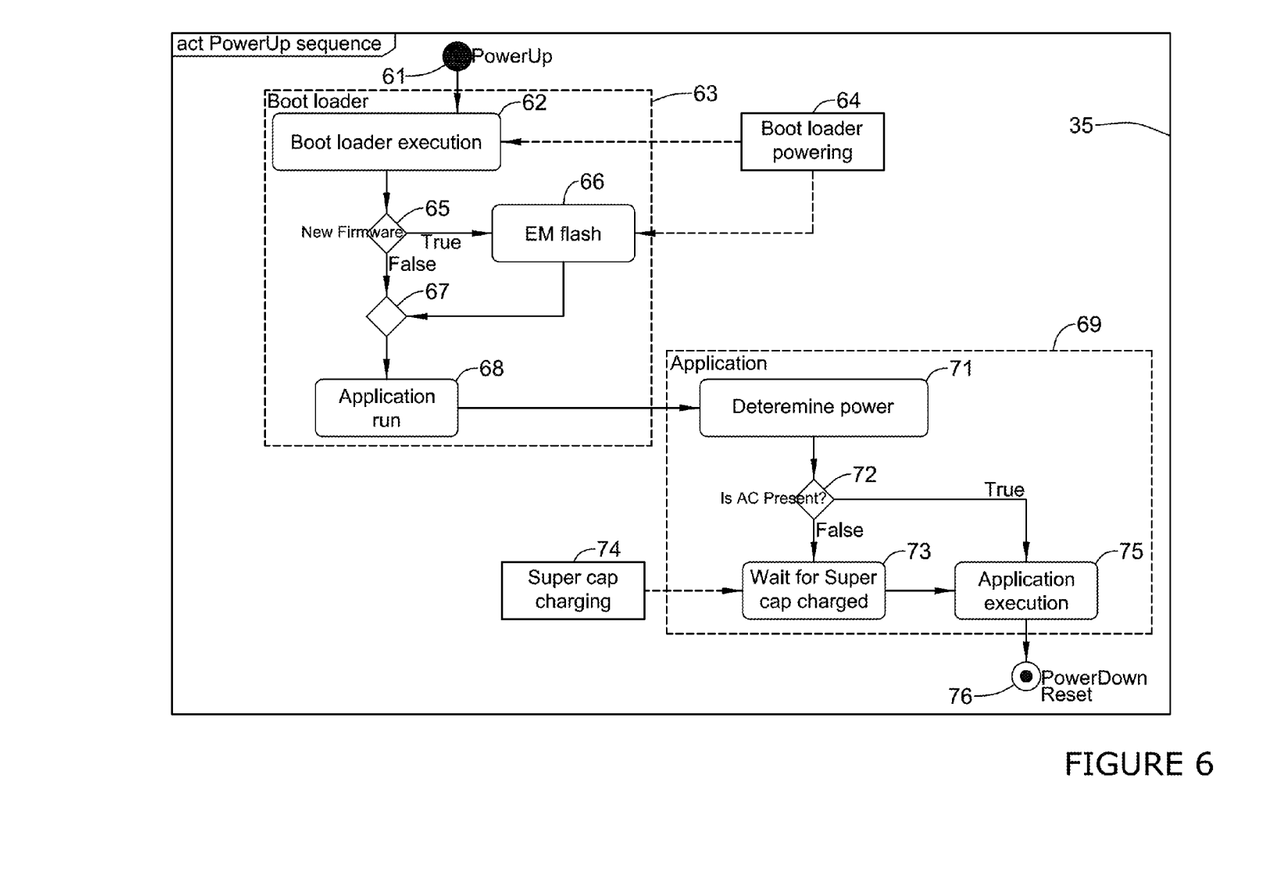
FIG. 6 is a diagram of a boot up sequence.

FIG. 6 is a diagram 35 of a power or boot up sequence. A boot loader screen may be displayed no matter what the power situation is. The boot loader may be powered from an AC line, if AC is present, or from a battery.

A possible issue may be that the boot loader boots up the application, but there is not enough power to run the application. Then the screen may go blank. One might protect the boot loader from displaying anything in case the battery level is at "SURVIVAL". One might protect the boot loader from programming the application micro in case the battery level is at "SURVIVAL". Based on the energy one has, and the charge rate that one might or might not display the "charging" state on an LCD. The LCD may be allowed in cases where that battery is good and the charge rate (PS) is at least a predetermined level, or the super capacitor voltage has certain level and the charge rate is at least a predetermined level. The super capacitor may be considered to be charged when the level allows a predetermined level second of a user interface run.

A radio run signal, as a GPIO example, may be noted. Because of the power limitations when powering using an energy harvesting circuit, both micros cannot necessarily boot at the same time. To be able to postpone the boot of a radio module, a general purpose input-output (GPIO) line between application micro and radio module may be implemented. The radio module microprocessor may scan this line and boot only in a situation the line is low (inverted logic). At the beginning, the line may be held high by a pull up resistor. The application may then drive the line high to keep the radio module from booting. As the application runs, the power may be determined. In a case where the thermostat runs on power harvesting or from a continuous power source, the line is held high until energy on the ultra cap is enough to be used and the Vcap>sufficient charge threshold. A 2.4 voltage value may be an illustrative example of the threshold. In this mode, the ultra cap may be charged and can provide enough power to start up the Wi-Fi.

The Vcap<sufficient charge threshold, the conditions to disable the radio run, may occur anytime during a thermostat run. In this case, the radio run line may be held high to prevent the radio module from booting, but the radio module may run further normally. In case the radio module micro resets for some reason, it may not boot up until Vcap>the sufficient charge value and the power conditions are satisfactory to run the radio module.

In case the radio module waits for the boot, the application may need to guarantee the toolkit not responding event is not processed. The toolkit does not necessarily run intentionally. This may be done by scanning the TX line from the radio module micro. If the radio module is waiting for the radio run signal, it may put the TX line (UART communication) low to signal information to the energy micro.

Powering an installer commissioning process may be noted. When the thermostat is not setup yet, the ability to provide power from the power stealing may be very limited. As the thermostat cannot turn on any relay (no configuration), it may use only the off cycle power stealing that is not able to provide enough power. One way in how to go through the installer commissioning process may be to use the battery to power the Wi-Fi access point mode.

Before the installer commissioning can start, the battery should be examined. Since the battery may be the only available power source, the battery level should be good enough to process an entire installation process. If the battery is not sufficient, the user may be asked to change the battery in order to continue the installer commissioning process.

If the battery level is good enough, the installer commissioning may start. As noted herein, the Wi-Fi may boot only if the thermostat is powered from the charged ultra cap (i.e., Vcap>sufficient charge threshold). But the access point of Wi-Fi is energy demanding and it may be better to run the AP mode directly from the battery or AC. After the AP is entered, the energy harvesting mode may be changed to provide the energy directly from the battery or AC.

The thermostat may be powered directly from the battery or AC until the installer commissioning is finished. Then the thermostat may go back to powering from the ultra cap and the thermostat may work in normal energy harvesting mode.

Field update power considerations may be noted. When the new field update is downloaded, the thermostat may have to take the powering mode into consideration as to whether it is able to proceed with the field update. In a corner case, it might not be able to run anymore, if the power sources are very bad. In such a situation, the application may need to postpone the re-programming of the device until the power is good enough to proceed with the field programming update.

According to a field programming update specification, the application micro may be the first micro to program. To do that, it should be guaranteed that the application micro will boot up after a reset. Therefore, the reset of the micro may be allowed only in case there is enough power for the boot up. This may primarily mean that there is either an AC power connected or batteries are good enough to do the boot and programming upgrade.

After the application micro is upgraded, the radio module may also be upgraded. After the thermostat goes to powering from a charged ultra cap, the radio module boot may be enabled and the micro can start with the programming upgrade. If the power is not sufficient during the programming of the radio module, the programming may be paused by driving high the radio run line. The programming may be re-enabled by the radio run again once it is driven low.

Wi-Fi reconnect algorithms may be noted. In the case where the Wi-Fi loses signal, it may be a quite energy demanding process to renew the connection with the Wi-Fi router. The Wi-Fi may try to connect to last known router. If this fails, the Wi-Fi chip may start to look through other channels to find out the lost router (roaming).

The roaming may be energy demanding. The device may scan the channels and constantly listen whether it catches the beacon signal from the router.

In the environment, where the Wi-Fi connection is not good, the attempts for reconnection may occur quite frequently. Because of the higher consumption of the Wi-Fi chip in this mode, the batteries should be protected. Otherwise, constant attempts for connection might deplete the battery sooner. To prevent this from happening, the radio module should know the energy mode of the energy harvesting and information of whether it is using the battery energy. If battery energy is used, the radio module should restrict use of the battery and cancel the reconnection attempt. Once the power is good again and the battery is not used anymore, the reconnection attempt may be done again.

The energy harvesting module may define measurement modes. Different power rails may be connected together or separated in order to measure overall consumption of the device or power consumption of each rail. The power broker should guarantee normal operation in these modes, so it may fake the states of power sources to make the application run normally.

Power broker data may be part of a thermostat diagnostics message. The power broker may collect statistical data to be distributed over Wi-Fi. The data may incorporate time in each mode, number of ac losses, number of transitions between modes, current power scheme, AC presence, and battery presence.

Diagram 35 of a power up sequence may begin at symbol 61 and proceed to a symbol 62 for boot loader execution with boot loader 63. Boot loader powering at symbol 62 may come from a symbol 64. The sequence may continue on to a symbol 65 which asks whether there is new firmware. If the answer is yes, then an application programming may occur at a symbol 66 which may receive boot loader powering from symbol 64. After symbol 66, the sequence may continue at symbol 67. Also, if the answer to a question at symbol 65 is no, then the sequence may continue to symbol 67. From symbol 67 to symbol 68, an application run may be indicated and a proceeding to an application within a symbol 69 beginning at symbol 71 where power may be determined. Then at a symbol 72, a question of whether AC is present. If an answer is no, then at symbol 73 where symbol 74 indicates a super cap is being charged, a wait until a super cap is charged to provide enough energy for an application run may be incurred. The super cap may be charged from a battery or power stealing. Subsequent to an action at symbol 73, the application may be executed at symbol 75. If the answer at symbol 72 is yes, then the application may also be executed at symbol 75. The application of symbol 69 may afterwards be exited and a power down or reset may occur at symbol 76.

To recap, an energy managing system for a thermostat may incorporate one or more processors and a power broker incorporated by one or more processors. The power broker may be connectable to one or more energy sources. The power broker may be connectable to one or more loads. The power broker may manage, according to a power scheme, power received from the one or more energy sources and power used by the one or more loads related to a thermostat. The one or more energy sources may be selected from a group consisting of batteries, energy harvesting modules, energy storage capacitors, and power line sources. Power usage by one or more loads may be approved by the power broker prior to the power usage.

Approval for power usage from the power broker may be based on a power scheme that incorporates an operating mode according to an amount of energy available and a priority of a task performed by a load, and a magnitude of the load.

The priority of the task may be determined according to factors of safety contribution, user need, an amount of energy available from the one or more sources, and convenience added by the task, in that order.

The factor of safety may incorporate at least gas valve control.

The power broker may approve or disapprove power usage by a load. If the power broker disapproves approval of power usage by the load, the load may again request approval and later receive approval for power usage by a peripheral. Once the load has approval for power usage and the load is using power, the power broker may reduce or terminate power usage by the load.

A power scheme may be selected from a group of schemes consisting of full power, stealthy saving, reduced user interface consumption, evident saving, substantial saving, maximum saving, and sleep only consumption.

An approach, for managing energy for peripherals of a thermostat, may incorporate providing one or more energy sources, receiving a request for energy usage submitted by one or more peripherals of or associated with a thermostat, and approving or disapproving the request based on an availability of energy relative to the request and a priority of the energy usage by the one or more peripherals.

If the request is disapproved, then the one or more peripherals that have a disapproved request may resubmit the request. If the request is approved, then the one or more peripherals may use an amount of energy in accordance with terms of the request as approved.

A power broker module may be used to perform one or more items selected from a group consisting of receiving the request for energy usage, approving or disapproving the request based on the availability of energy and priority of the energy usage, and selecting the one or more sources of energy for usage according to a power scheme.

The amount of energy in accordance with terms of the request as approved may be a specific allotment or a usage rate of energy per unit time subject to being terminated.

The one or more sources of energy may be selected from a group consisting of batteries, energy harvesting modules, capacitive storages, and line power sources. The approach may further incorporate topping off a capacitive storage with energy whenever possible by an energy harvesting module, a line power source or a battery.

The one or more peripherals may be one or more items of a group consisting of a display, a backlight, a radio receiver, a radio transmitter, a processor, a sensor, and a memory.

A device, having energy management, may incorporate a processor having a power broker module connectable to one or more energy sources, and one or more peripherals that use energy connected to the power broker. The power scheme may incorporate a set of rules as to how energy usage by the one or more peripherals is to be managed and how the energy sources are to be managed. The one or more peripherals may have to make a request to the power broker module for energy. The power broker module may need to approve the request before the one or more peripherals can use the energy specified in the request. The device may incorporate a thermostat.

An approval or disapproval of the request from the one or more peripherals may be at least partially based on an amount of energy available from the one or more energy sources.

The approval or disapproval of the request may be further based on a priority of a function of the one or more peripherals.

The one or more energy sources may be selected from a group consisting of batteries, energy storage capacitors, power line sources, and energy harvesting modules.

The one or more peripherals may be selected from a group consisting of processors, memories, displays, backlights, optical transmitters and receivers, and radio transmitters and receivers.

The approval or disapproval of the request may be further based on a power scheme developed from determined battery life, battery level, a number of discharges of an energy storage capacitor, energy storage capacitor charge level and voltage, and AC power line status.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An energy managing system of a thermostat, comprising:
   one or more processors; and
   a power broker within the thermostat and incorporated by the one or more processors; and
   wherein:
   the power broker is connected to one or more energy sources of the thermostat;
   the power broker is connected to one or more loads within the thermostat;
   the power broker manages, according to a power scheme, power received from the one or more energy sources and power requested for use in a request by the one or more loads of the thermostat, wherein the power scheme comprises a set of rules as to how energy usage by the one or more loads is to be managed and how the energy sources are to be managed;
   the power broker approves or disapproves usage by a load of a specified power requested in the request by the one or more loads according to the power scheme;
   if the request is disapproved, then the one or more loads that has a disapproved request resubmits the request;
   if the request is approved, then the one or more loads uses the power specified in the request;
   the one or more energy sources are selected from a group consisting of batteries, energy harvesting modules, energy storage capacitors, and power line sources.

2. The system of claim 1, wherein power usage by one or more loads is approved by the power broker prior to the power usage.

3. The system of claim 2, wherein approval for power usage from the power broker is based on a power scheme that incorporates an operating mode according to an amount of energy available and a priority of a task performed by a load, and a magnitude of the load.

4. The system of claim 3, wherein the priority of the task is determined according to ordered factors comprising safety contribution, user need, an amount of energy available from the one or more sources, and convenience added by the task, in the order listed, where an ordered factor listed before a next ordered factor has a greater priority than the next ordered factor.

5. The system of claim 4, wherein the factor of safety comprises at least gas valve control.

6. The system of claim 2, wherein:
   if the power broker disapproves approval of power usage by the load, the load can again request approval and later receive approval for power usage by a peripheral; and
   once the load has approval for power usage and the load is using power, the power broker can reduce power usage by the load while the load continues to operate.

7. The system of claim 3, wherein a power scheme may be selected from a group of schemes consisting of full power, stealthy saving, reduced user interface consumption, evident saving, substantial saving, maximum saving, and sleep only consumption.

8. A method, for managing energy for peripherals of a thermostat, comprising:
providing one or more energy sources;
receiving a request for a specified energy usage submitted by one or more peripherals within the thermostat; and
approving or disapproving the request based on an availability of energy relative to the request and a priority of the energy usage by the one or more peripherals allowing for a higher priority energy usage to be approved even when a lower priority energy usage has not been approved; and
wherein:
if the request is disapproved, then the one or more peripherals that has a disapproved request resubmits the request; and
if the request is approved, then the one or more peripherals uses the specified energy usage in accordance with terms of the request as approved.

9. The method of claim 8, wherein a power broker module within the thermostat is used to perform one or more items selected from a group consisting of receiving the request for energy usage, approving or disapproving the request based on the availability of energy and priority of the energy usage, and selecting the one or more sources of energy for usage according to a power scheme.

10. The method of claim 8, wherein the amount of energy in accordance with terms of the request as approved is a specific allotment or a usage rate of energy per unit time subject to being terminated.

11. The method of claim 8, wherein the one or more sources of energy are selected from a group consisting of batteries, energy harvesting modules, capacitive storages, and line power sources.

12. The method of claim 11, further comprising topping off a capacitive storage with energy whenever possible by an energy harvesting module, a line power source or a battery.

13. The method of claim 8, wherein the one or more peripherals are one or more items of a group consisting of a display, a backlight, a radio receiver, a radio transmitter, a processor, a sensor, and a memory.

14. A thermostat, having energy management, comprising:
one or more energy sources;
a processor having a power broker module within the thermostat and connectable to the one or more energy sources; and
one or more peripherals within the thermostat, the one or more peripherals use energy and are connected to the power broker module; and
wherein:
a power scheme comprises a set of rules as to how energy usage by the one or more peripherals is to be managed and how the energy sources are to be managed;
the one or more peripherals connected to the power broker have to make a request to the power broker module for a specified energy; and
the power broker module needs to approve the request, based on the power scheme and the specified energy, before the one or more peripherals can use the specified energy in the request;
if the request is disapproved, then the one or more peripherals that has a disapproved request resubmits the request; and
if the request is approved, then the one or more peripherals uses the specified energy in accordance with terms of the request as approved.

15. The device of claim 14, wherein an approval or disapproval of the request from the one or more peripherals is at least partially based on an amount of energy available from the one or more energy sources.

16. The device of claim 15, wherein the approval or disapproval of the request is further based on a priority of a function of the one or more peripherals.

17. The device of claim 15, wherein the one or more energy sources are selected from a group consisting of batteries, energy storage capacitors, power line sources, and energy harvesting modules.

18. The device of claim 15, wherein the one or more peripherals are selected from a group consisting of processors, memories, displays, backlights, optical transmitters and receivers, and radio transmitters and receivers.

19. The device of claim 15, wherein the approval or disapproval of the request is further based on a power scheme developed from determined battery life, battery level, a number of discharges of an energy storage capacitor, energy storage capacitor charge level and voltage, and AC power line status.

* * * * *